United States Patent [19]
Grube et al.

[11] Patent Number: 5,261,150
[45] Date of Patent: Nov. 16, 1993

[54] AUTOMATED HAZARDOUS WASTE ACCESSING APPARATUS

[76] Inventors: John Grube, R.D. 1 Box 533-C, Highland Lakes, N.J. 07422; Calvin Farber, P.O. Box 32, Baldwin Dr., Vernon, N.J. 07462

[21] Appl. No.: 639,522

[22] Filed: Jan. 10, 1991

[51] Int. Cl.$^5$ .............................................. B23C 1/20
[52] U.S. Cl. ..................... 29/560; 30/444; 81/3.2; 81/57.33; 83/745; 83/930; 248/225.31
[58] Field of Search ............... 408/76; 29/560, 26 B, 29/563; 81/3.4, 57.24, 3.39, 3.29, 3.09, 3.15, 3.2, 54, 57.33, 463, 464; 83/745, 930, 243, 244; 173/37; 409/179; 248/225.31; 30/443, 444

[56] References Cited

U.S. PATENT DOCUMENTS

| | | | |
|---|---|---|---|
| 3,762,829 | 10/1973 | Yilmaz | 408/76 X |
| 3,854,889 | 12/1974 | Lemelson | 29/563 |
| 4,764,063 | 8/1988 | Rabe et al. | 409/179 |

FOREIGN PATENT DOCUMENTS 2238838  2/1974  Fed. Rep. of Germany ........ 408/76

Primary Examiner—Z. R. Bilinsky
Attorney, Agent, or Firm—Anthony J. Casella; Gerald E. Hespos

[57] ABSTRACT

Apparatus is provided for accessing hazardous materials stored in a container. The apparatus includes a base that is securely mountable to the container of hazardous materials. The base may include an assembly of clamps or an assembly of suction cups adaptable to containers of varying sizes and configurations. The frame is removably and adjustably mounted to the base. The frame includes plural gantries that are selectively movable toward or away from the base and the container to which the base is mounted. A tool is mounted to each gantry. A first tool is operative to perform work on the container, while the second tool is operative to position the first tool. The tools are powered and controlled from a remote location preferably by pneumatic power.

11 Claims, 2 Drawing Sheets

AUTOMATED HAZARDOUS WASTE ACCESSING APPARATUS

BACKGROUND OF THE INVENTION

Hazardous materials are used in various manufacturing processes and/or are the by-products of such processes. The hazards associated with such materials can vary greatly, and in many instances, the hazards are not fully known. Some such materials are capable of causing direct and immediate physical harm if consumed or brought into contact with skin surfaces. Other hazardous materials emit noxious vapors which can cause immediate and serious harm if inhaled. Many other materials interact with the body more slowly and cause health problems years after the initial exposure. Still other hazardous materials present a smaller risk to humans, but a significant risk to other parts of the environment, such as plants and wildlife. In still other instances, the materials are highly volatile and may explode or ignite when subjected to air, heat, physical impact or electric spark.

Increased awareness of the health and environmental risks associated with hazardous materials has led to increased government regulations relating to the processing and disposal of such materials. The greater care that is necessarily imposed by government regulation has significantly increased the cost of handling and disposing of hazardous materials. The direct costs associated with the disposal of hazardous materials often are avoided by merely abandoning the materials at an inconspicuous dump site. For example, unlabelled drums of a hazardous material having a high disposal cost may merely be left at an abandoned lot or warehouse. In most instances the materials are stored in large cylindrical metallic drums with a threadedly removable plug in the top end for accessing the materials stored therein. The drums come in many different sizes and configurations. Common sizes for drums are 30 gallons and 55 gallons, but other sizes are available. Most drums include a rim at the interface of the cylindrical side wall and the circular top. In some instances the rim is tapered outwardly while in other instances the rim is of generally rectangular cross-section.

An unlabelled abandoned drum of material must be treated with utmost care and with the assumption that the material stored therein is extremely hazardous and highly volatile. The method of disposing of a hazardous material varies in accordance with the type of material. Thus, the specific handling of material in an abandoned drum cannot be finally determined until the identity of the material is positively determined. However, the drum generally cannot be moved to a location where such analysis can be carried out safely because the unknown material in the drum may be sufficiently volatile to explode in response to any aggressive movement. Furthermore, rust caused by environmental moisture and corrosion caused by the material in the drum could cause the drum to rupture or otherwise fail in response to such movement.

Chemical "sniffers", such as "spectrometers" are available to perform some on-site analysis of chemicals stored in abandoned drums. An appropriate means for disposing of the chemicals can be employed once the materials have been positively identified by the "sniffer". However, the chemical "sniffers" must have access to the materials in the drum. In some instances access is achieved by removing the threaded plug from the top of the drum. However, the manual removal of the threaded plug can expose the technician to undetermined health risks. In other instances the plug may be rusted or corroded into place or may be inaccessible, such as when the drum is stored in an inverted condition. In these situations it may be necessary to drill directly through an uppermost portion of the drum to access the materials stored therein. Such drilling may exacerbate the substantial environmental and health risks, particularly the risks to the technician performing the drilling or cutting operation.

Even properly handled chemicals often must be transported, and periodic accidents in such transportation are unavoidable. For example, tank trucks may overturn in highway accidents or railway tank cars may overturn during derailments. The tank carried by the truck or railway car may be very large and may be of any shape. Furthermore, most tanks are not constructed to withstand the forces that would be necessary to right the capsized vehicle with the material stored in the tank. Any attempt to place the full tank back in an upright position may rupture the tank. The probability for rupture is rendered even greater by the likelihood of damage to the tank as a result of the accident Consequently, the typical method for addressing such accidents is to initially transfer the hazardous material from the vehicle involved in the accident to a nearby vehicle for subsequent transportation. This often will require drilling, cutting, or otherwise placing a hole through the highest point on the overturned vehicle. Most of the problems associated with accessing materials stored in an abandoned drum will exist in attempting to access materials in an overturned tank truck or railroad car. In particular, the technician performing manual cutting is subjected to very substantial personal health risk. Furthermore, the highest point on the tank at which the access must be made often is curved and provides very poor support for the worker and/or the equipment being employed to cut or drill through the tank.

In view of the above, it is an object of the subject invention to provide an apparatus for safely accessing materials stored in a container.

It is another object of the subject invention to provide an apparatus for remotely accessing materials stored in a container.

An additional object of the subject invention is to provide an apparatus that is securely mountable to containers having any of several different sizes and shapes.

Still a further object of the subject invention is to provide an apparatus selectively employable to either remove a threaded plug from a container or to form a hole through a wall of a container.

Yet another object of the subject invention is to provide an apparatus that is securely mountable to a container having any of several different curvatures.

SUMMARY OF THE INVENTION

The subject invention is directed to an apparatus for remotely accessing materials stored in a container. The apparatus of the subject invention comprises a substantially rigid base. Container attachment means are mounted to the base for securely attaching the base and other portions of the apparatus to the container that must be accessed. The attachment means may be adjustable with respect to other parts of the base. The apparatus further comprises adjustable accessing means mounted to and extending from the base. The accessing means is disposed on a portion of the base to permit direct access to the portion of the container through which access is to be attained. The accessing means may comprise means for rotatably removing a threaded plug or other such closure means. The accessing means may alternatively or additionally include means for forming an aperture through a selected portion of the container.

The apparatus of the subject invention further comprises control means. The control means may comprise a pneumatic supply for selectively delivering controlled pneumatic pressure to the accessing means to enable appropriate operation thereof. The control means preferably is disposed at a location remote from the accessing means and the container to which the base is mounted. The control means may be at least partly responsive to radio signals Thus, the control means may further comprise a radio signal transmitter which may be disposed at a location further remote from the apparatus and the pneumatic supply.

The apparatus may be specifically constructed for mounting on a generally cylindrical drum to access the material in the barrel through the upwardly facing wall thereof. For these purposes, the mounting means may comprise a plurality of clamp means adjustably mounted to the base for securely gripping portions of the generally cylindrical drum. The clamp means may be constructed to optionally engage any of several different rim constructions for the top of the drum. The clamp means may further be subject to sufficient adjustment to enable drums of many different sizes to be accessed. For example, the base of the apparatus may define a generally Y-shaped planar structure having a plurality of clamp members mounted thereto. At least one of the clamp members may be movable longitudinally along one leg of the Y-shaped base to effect secure clamping of the container top between the longitudinally movable clamp and the other clamps of the base. At least selected clamps may have a plurality of optional clamping faces which may be rotated into secure engagement with the rim of the barrel or drum adjacent the intersection of the cylindrical side wall and the generally planar circular top wall.

The accessing means may comprise a frame extending rigidly from the base. A pneumatically powered machine tool may be mounted to the frame for controlled movement toward and away from the base. The machine tool may be an impact wrench, a treaded lead screw and a bit selected to remove a threaded plug in the container. Alternatively the machine tool may be rotatable and operative to cut a hole through the container. The machine tool may further be operative to selectively advance toward or away from a surface of the container on which work is to be performed.

The apparatus may alternatively be constructed to mount to a nonplanar surface, such as an arcuate wall of a tank truck or the like. The attachment means attached to the base may comprise at least one suction cup for securely gripping the arcuate surface to which the apparatus is to be mounted. Preferably a plurality of suction cups are provided, and most preferably three suction cups. The suction cups preferably are pivotally mounted to the base to effect secure attachment to an arcuate surface of indefinite curvature. Thus, the suction cups may be rotated into an appropriate alignment for securely attaching to the highest point on an indeterminate arcuate surface. The suction cups may include pneumatic means for selectively releasing the gripping force of the suction cups.

The apparatus may define a system of apparatus comprising at least one attachment means and at least one accessing means, with the respective attachment and accessing means being interchangeable.

DETAILED DESCRIPTION OF THE PREFERRED EMBODIMENTS

Figure 1:
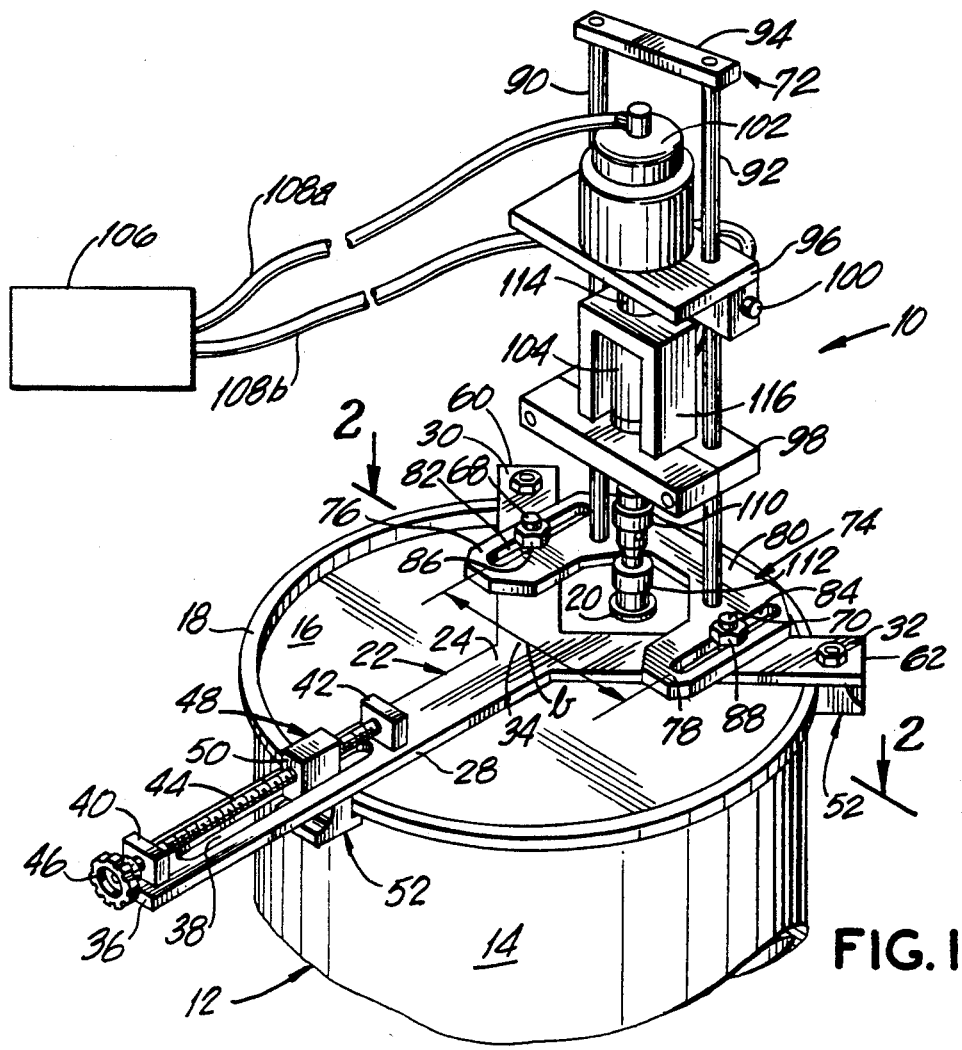
FIG. 1 is a perspective view of an apparatus in accordance with the subject invention mounted to a drum of hazardous material.
Figure 2:
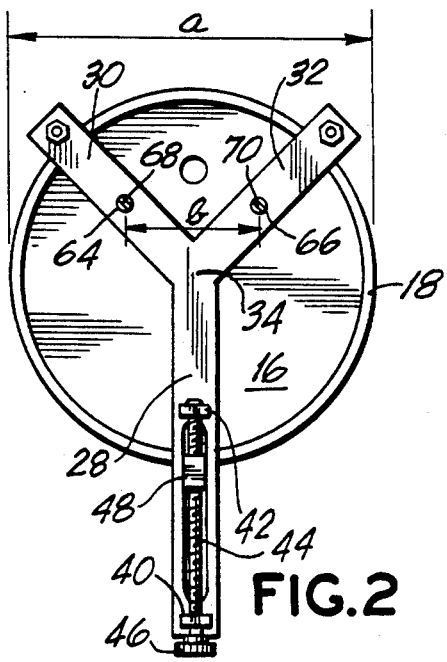
FIG. 2 is a cross-section taken along line 2—2 in FIG. 1.
Figure 3:
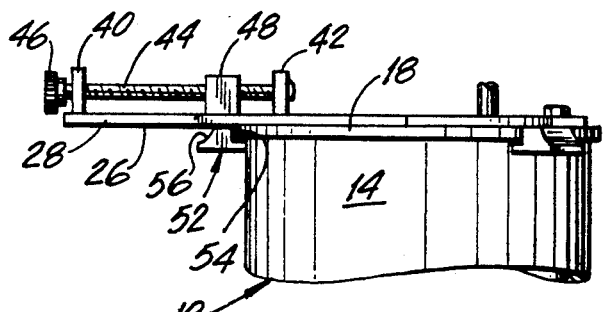
FIG. 3 is a side elevational view of the apparatus of FIGS. 1 and 2 shown in a first clamping orientation.
Figure 4:
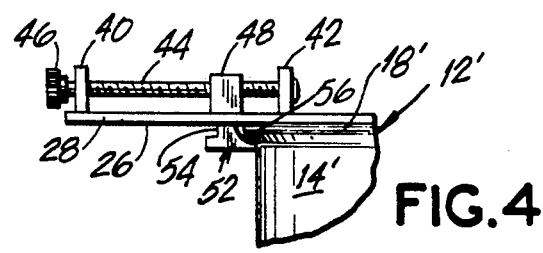
FIG. 4 is a side elevational view similar to FIG. 3 but showing the apparatus in a second clamping orientation.

One embodiment of the apparatus of the subject invention is identified generally by the numeral 10 in FIGS. 1-4, and it is specifically intended for accessing a hazardous waste material stored in a drum 12. The drum 12 includes a generally cylindrical side wall 14, a top wall 16 and a bottom wall (not shown). The top wall 16 is connected to the cylindrical side wall 14 by a top rim 18 which, in the embodiments depicted in FIGS. 1-3 is generally rectangular in cross-sectional configuration. The top wall 16 of the drum 12 includes a threaded bushing 20 securely mounted therein and having a threaded nipple (not shown) engaged with the bushing 20. The nipple typically includes a non-circular engagement portion which may be engaged by a wrench or other tool for effecting the threaded disengagement of the nipple from the bushing 20. With reference to FIG. 2, the top wall 16 is substantially circular and defines a diameter "a" which may vary significantly from one drum 12 to the next. Additionally, FIG. 4 depicts a drum 12' having a side wall 14' and a top rim 18' which is of generally frustoconical cross-sectional shape, in contrast to the rectangular cross-sectional shape of the rim 18 depicted in FIGS. 1 and 3.

The hazardous waste accessing apparatus 10, as shown most clearly in FIG. 1, comprises a generally planar substantially rigid base 22 having a generally planar top surface 24 and an opposed substantially planar bottom surface 26 as illustrated in FIG. 3. The base 22 is formed to define an elongated leg 28 and a pair of arms 30 and 32 extending outwardly from a common hub portion 34. The leg 28 and arms 30 and 32 of the base 22 may be formed from a unitary piece of metal material or may be fabricated from three separate pieces of metal that are welded or otherwise joined at the hub portion 34.

The leg 28 of the base 22 includes an end 36 defining the portion thereof remote from the hub 34 of the base 22. The leg 28 is further characterized by an elongated slot 38 extending entirely therethrough from the top surface 24 to the bottom surface 26 of the base 22. The length and disposition of the slot 38 is selected to enable the apparatus 10 to be used with drums 12 of many different sizes as explained further herein.

Blocks 40 and 42 are mounted to the top surface 24 of the base 22 in proximity to the slot 38 through the leg 28. More particularly, the block 40 is rigidly mounted to the leg 28 intermediate the slot 38 and the end 36. The block 42 is mounted to the leg 28 intermediate the slot 38 and the hub portion 34 of the base 22. The blocks 40 and 42 are provided with apertures for receiving a threaded rod 44, such that the rod 44 is rotatable about its longitudinal axis and relative to the blocks 40 and 42. An actuator knob 46 is secured to the end of the threaded rod 44 passing through the block 40, such that rotation of the actuator knob 46 effects the rotational movement of the threaded rod 44.

A clamping block 48 extends from a location above the top surface 24 of the base 22 and into the slot 38 of the leg 28 for slidable movement therealong. Portions of the clamping block 48 disposed above the slot 38 are defined by a threaded aperture 50 extending therethrough and disposed in threaded engagement with the rod 44. By this arrangement, rotation of the rod 44 about its longitudinal axis will cause the clamping block 48 to threadedly advance along the rod 44 and to slidably advance along the length of the slot 38. A rim clamp 52 is mounted to the portion of the clamp block 48 engaged in the slot 38 and extends below the lower surface 26 of the base 22. The rim clamp 52 includes first and second clamp faces 54 and 56 respectively. The first clamp face 54 is of generally rectangular configuration and is configured to engage the rim 18 of comparable rectangular cross-sectional configuration as shown in FIG. 3. The second clamp face 56 is of frustoconical or arcuate configuration and is configured to engage a rim 18' of comparable cross-sectional configuration as depicted most clearly in FIG. 4. The rim clamp 52 is rotatable relative to the clamp block 48 to enable a first or second clamp face 54 or 56 to be rotated into engagement with the correspondingly configured rim 18 or 18' of a drum 12 or 12'.

The first and second arms 30 and 32 of the base 22 extend from the hub portion 34 and terminate at ends 60 and 62 respectively. Rim clamps 52 as described above are mounted to the respective arms 30 and 32 in proximity to the first and second ends 60 and 62 thereof. The rim clamps 52 are rotatable relative to the arms 30 and 32 to align the first and second clamp faces 54 and 56 thereof with a correspondingly configured rim 18 or 18'.

The arms 30 and 32 are characterized by apertures 64 and 66 respectively extending therethrough at distance "b" from one another. Bolts 68 and 70 extend through the apertures 64 and 66 to enable mounting of a frame thereto as explained below.

A tool frame 72 is mounted to bolts 68 and 70 and extends upwardly from the base 22. More particularly, the frame 72 includes a generally planar support platform 74 of generally U-shaped configuration. The platform 74 is defined by platform arms 76 and 78 which are connected to one another by a bight portion 80. The platform arms 76 and 78 are provided with parallel slots 82 and 84 which are spaced from one another by a distance "b" which corresponds to the distance between the bolts 68 and 70. Thus, the slots 82 and 84 in the support platform 74 may be mounted over the bolts 68 and 70 to enable sliding movement of the platform relative to the base 22 in a direction generally parallel to the leg 28 thereof. Thus, the support platform 74 and the entire frame 72 extending therefrom can be adjustably mounted to the base 22 as explained further below. However, the support platform 74 can be securely, rigidly mounted to a selected location on the frame 22 by nuts 86 and 88 mounted to the corresponding bolts 68 and 70.

A pair of non-threaded guide columns 90 and 92 extend orthogonally from the support platform 74 and generally parallel to one another. The support columns 90 and 92 are connected to one another by a stabilizing bar 94 at the ends thereof remote from the support platform 74 Upper and lower gantries 96 and 98 are slidably movable along the support columns 90 and 92 intermediate the support platform 74 and the stabilizer bar 94. The upper gantry 96 is provided with clamps 100 for locking the upper gantry 96 at a selected location along the support columns 90 and 92.

The apparatus 10 further comprises upper and lower tools 102 and 104 which are mounted respectively to the upper and lower gantries 96 and 98. The upper tool 102 is A pneumatically operable impact wrench and is connected to pneumatic supply and control ; means 106 by hose 108 of indeterminate length to enable operation of the apparatus 10 at a safe distance from the drum 12. The lower tool 104 includes a threaded lead screw 110 and working head 112 extending below the lower gantry 98 and toward the top 16 of the drum 12. Periodic axial forces exerted by the impact wrench 102 acts on the working head 112 which will interact with lead screw 110 for rotating and axially lifting the nipple engaged in the threaded bushing 20. Alternatively, in some situations, the nipple may not be present, may be inaccessible or may be corroded or rusted to the bushing 20. In these situations, the lower tool 104 may also be a pneumatically powered rotatable tool and the working head 112 may define a drill bit for drilling a hole through the upper wall 16 as explained further below.

In operation, the apparatus 10 is employed by initially rotating the knob 46 and the rod 44 connected thereto such that the clamp block 48 and rim clamp 52 connected thereto are moved toward the block 40 and away from the block 42. The base 22 is then mounted over the upper wall 16 of the drum 12 such that the leg 28 and the arms 30 and 32 are supported on the rim 18. The rim clamps 52 mounted to the arms 30 and 32 are then rotated such that the appropriate clamping faces 54 or 56 thereof are aligned in opposed relationship to the rim 18 or the rim 18'. The base 22 is then moved relative to the drum 12 such that the rim clamps 52 are urged into tight engagement with the rim 18. The rim clamps 52 mounted to the arms 30 and 32 are capable of rotation to align with rims 18 of different respective circumferences. The knob 46 and the rod 44 connected thereto is then rotated such that the clamp block 48 and the rim clamp 52 mounted thereon are urged toward and into tight clamping engagement with the rim 18 to securely hold the entire base 22 on the drum 12.

Use of the apparatus 10 proceeds by mounting the frame 72 to the base 22. More particularly, the slots 82 and 84 in the support platforms 74 are placed over the bolts 68 and 70 and the entire frame 72 is slid longitudinally along the base 22 to achieve at least approximate alignment of the working head 112 with a selected location on the upper wall 16 of the drum 12. For example, the working head 112 may be aligned with the threaded bushing 20 and the nipple engaged therein. Nuts 86 and 88 are used to securely position the frame 72 on the base 22. The upper gantry 96 and the lower gantry 98 connected thereto are then slid along the support columns 90 and 92 to achieve proper disposition of the working head 112 to the top wall 16 of the drum 12. Clamps 100 are then employed to securely fix the upper and lower gantries 96 and 98 to the support columns 90 and 92.

The contents of the drum 12 may next be accessed from a remote location by employing the pneumatic control system 106. More particularly, pneumatic fluid is applied selectively through hoses 108a and 108b to selectively operate the upper and impact wrench 102. The impact wrench 102 is operated to move the working head 112 away from the top wall 16, through cooperation with the lead screw 110. The accessing of the contents of the drum 12 often represents the most hazardous aspect of waste removal or treatment. After the access has been completed, subsequent work may be performed by the above described sniffers, material treatment apparatus or material removing apparatus.

Figure 5:
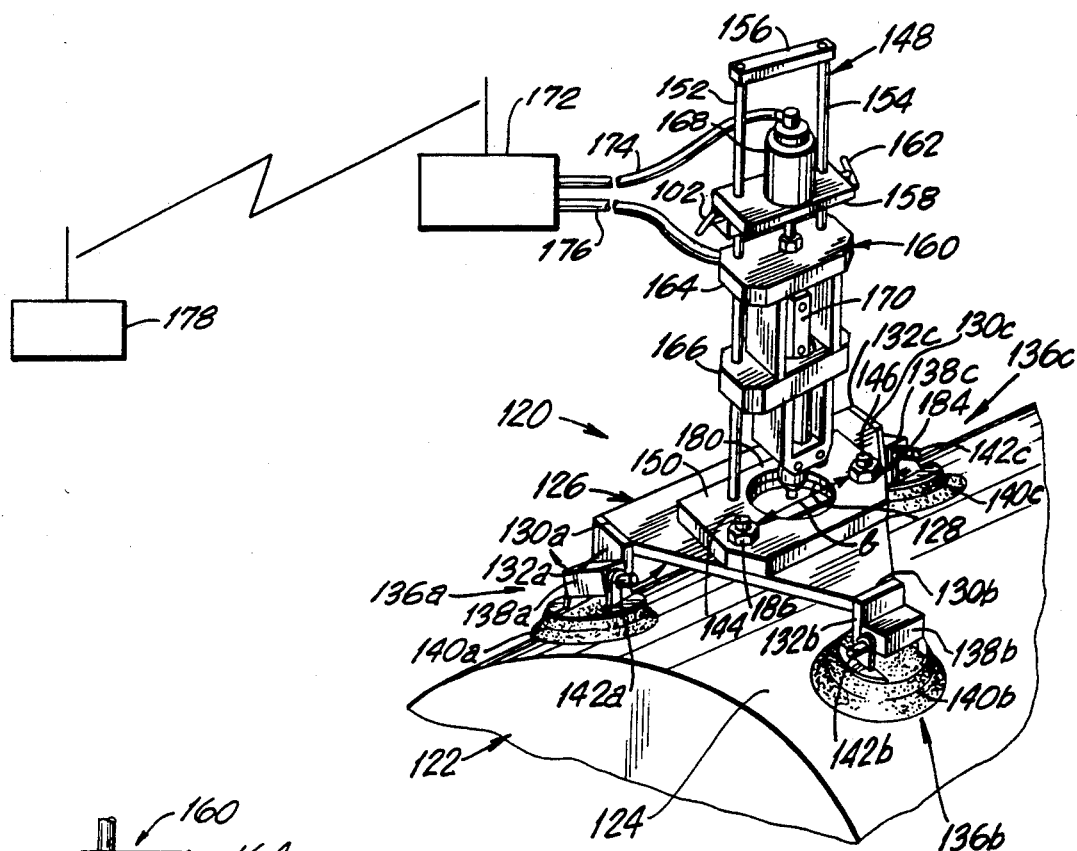
FIG. 5 is a perspective view of an alternate apparatus in accordance with the subject invention.
Figure 6:
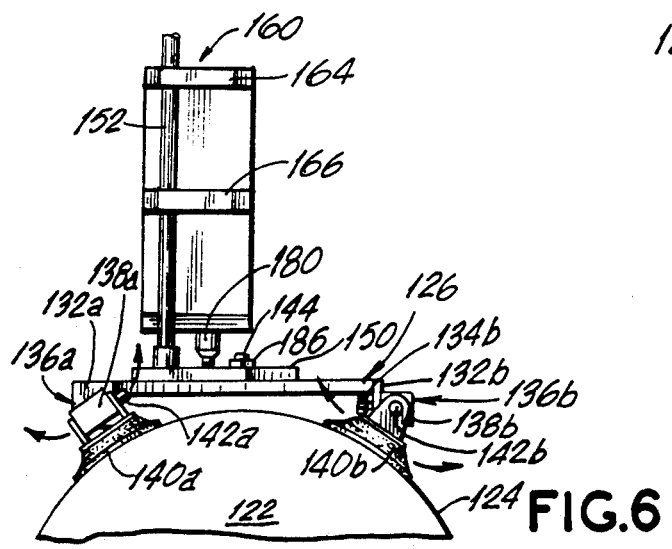
FIG. 6 is a side elevational view of the apparatus shown in FIG. 5.

An alternate embodiment of the invention is identified generally by the numeral 120 in FIGS. 5 and 6 and is particularly adapted for accessing materials stored in a large tank 122 such as a tank truck, a railway tank car or a non-vehicular storage tank. As noted above, in these situations it is typically necessary to perform work on the highest location of the tank 122. This highest location may defined by an arcuate surface 124 through which an access hole must be formed.

The apparatus 120 includes a generally planar base 126 having an aperture 128 extending therethrough. The base 126 is of generally truncated triangular shaped with truncated first, second and third corners 130a-c. First through third support legs 132a-c extend from the respective corners 130a-c and generally orthogonal to the base 126. The support legs 132a-c are generally planar and are provided with bolts 134a-c extending orthogonally therethrough as depicted most clearly in FIG. 6. First through third mounting assemblies 136a-c are mounted to the respective support legs 132a-c. Each mounting assembly 136a-c is provided with a mounting block 138a-c which is adjustably and removably mounted to the bolt 134a-c for adjustable alignment relative to the base 126. In particular, the mounting block 136a-c may be rotated about the axis defined by the associated bolt 134a-c to achieve an alignment of the mounting assembly 136a-c that conforms to the arcuate or other non-planar configuration of the tank 122. The mounting assemblies 136a-c further comprise elastomeric suction cups 140a-c which are pivotally mounted to the blocks 138a-c for rotation about axes extending orthogonal to the respective bolt 134a-c. Pressure release means 142a-c are provided on the mounting assemblies 136a-c to enable easy selective release of the suction cups 140a-c from the tank 122.

Portions of the base 126 substantially on opposite sides of the aperture 128 therethrough comprise frame mounting bolts 144 and 146 extending therethrough substantially orthogonal to the plane defined by the base 126. The frame mounting bolts 144 and 146 are spaced from one another by distance "b" which equals the distance "b" on the base 22 described above to enable mounting of the frame 72 or an alternate support frame as explained further herein.

Remaining portions of the apparatus 120 are structurally and functionally similar to portions of the apparatus 10 that are mounted to the base 22 as described above and illustrated in FIGS. 1-4. More particularly, a support frame 148 is rigidly mounted to the base 126. Specifically, the support frame 148 includes a support platform 150 having apertures engageable over the bolts 144 and 146 for secure rigid mounting to the base 126. The support frame further includes parallel support columns 152 and 154 extending orthogonally from the support platform 150. A stabilizing bar 156 extends between and connects portions of the support columns 152 and 154 remote from the support platform 150. An upper gantry 158 and a lower gantry assembly 160 are mounted for movement along the support columns 152 and 154. The upper gantry includes locking means 162 for locking the upper gantry 158 at a selected position along the support columns 152 and 154. The lower gantry assembly 160 is functionally similar to the lower gantry 98 in the previously described embodiment, but is structurally more complex. In particular, the lower gantry assembly 160 includes first and second plates 164 and 166 which are slidably movable along the support columns 152 and 154 and relative to the upper gantry 160. Upper and lower pneumatically operated tools 168 and 170 are mounted respectively to the upper gantry 158 and the lower gantry assembly 160. The tools are powered by pneumatic pressure supplied from a pneumatic control system 172 through hoses 174 and 176 respectively. In this embodiment, the pneumatic control system 172 comprises solenoid valves (not shown) that operate in response to radio signals generated by the radio transmitter 178.

In use, the base 126 is mounted to the high spot on the arcuate tank 122. Secure mounting is achieved by initially loosening the mounting bolts 134a-c and pivotinq the respective mounting assemblies 136a-c into alignment for secure mounting to the particular non-planar configuration of the tank 122. The suction cups 140a-c of the mounting assemblies 136a-c are then pushed into gripping engagement with the arcuate surface 124 of the tank 122 and the respective mounting bolts 134a-b are tightened. The frame 148 is then mounted to the base 126 in a manner similar to that explained for the previous embodiment. In particular, the apertures of the support platform 150 are placed over the bolts 144 and 146 and the frame 148 is secured in position by nuts 184 and 186. The upper gantry 158 is then fixed at a selected location along the support columns 152 and 154. Signals generated by the transmitter 178 cause the upper and lower tools 168 and 170 to operate. Initially, the upper tool 168 will be operated to move the working head 180 of the lower tool 170 into proximity with the tank 122. The lower tool 170 may then be employed to perform work, such as drilling, on the tank 122. After drilling the hole through the wall of the tank 122, the upper tool may again be activated to move both the lower tool and the lower gantry assembly 160 away from the tank 122.

It is to be understood that the base 22 depicted in FIGS. 1-4 may be interchanged with the frame 148 depicted in the embodiment of FIG. 5. Similarly, the base 126 depicted in FIGS. 5 and 6 may be employed with the frame 72 of FIG. 1. In this manner, a cutting or drilling function can be carried out on the top of the circular drum 12 by merely employing the frame 148 and the cutting tools depicted thereon with the base 22. Similarly, a plug removal function can be employed on an overturned tank, truck, or the like by employing the plug removal tool of FIG. 1 in combination with the base 126 with the suction cup means as shown in FIGS. 5 and 6.

In summary, an apparatus is provided with a base having means for mounting to a container of hazardous material. The base may include an assembly of clamps or an assembly of suction cups or other such mounting means. A frame is mountable to the base and includes tools movable relative to the frame toward and away from the base and the container of hazardous material to which the base is mounted. The tools can be operated from a remote location by pneumatic control means and/or by radio control means.

While the invention has been described with respect to certain preferred embodiments, it is apparent that various changes can be made without departing from the scope of the invention as defined by the appended claims.

We claim:

1. Apparatus for accessing hazardous materials stored in a container, said container having a generally cylindrical side wall and opposed generally planar top and bottom walls connected to the side wall, said apparatus comprising:
   a substantially planar base for mounting adjacent the planar top wall of the container;
   adjustable mounting means mounted to the base, said mounting means comprising at least three clamps mounted to the base, said clamps being configured for clampingly engaging the cylindrical side wall at locations in proximity to the top wall, at least one said clamp being movable generally parallel to the base for securely but releasably engaging the cylindrical side wall between the clamps and mounting the base to the container;
   a frame mounted to the base;
   at least one tool movably mounted to the frame for selectively performing work on the top wall of the container; and
   control means for operating the tool from a location remote from the container whereby the apparatus can be securely mounted to the container and can be operated from the remote location for safely accessing the hazardous materials stored in the container.

2. Apparatus as in claim 1 wherein said clamps are pivotable about substantially parallel axes orthogonal to said base.

3. Apparatus in claim 2 wherein each said clamp includes a plurality of clamp faces of different respective configurations for engaging selected portions of a container of corresponding configurations.

4. Apparatus as in claim 1 wherein the frame is removably mountable to the base.

5. Apparatus as in claim 1 wherein the frame is adjustably mountable to the base for secure attachment at each of the plural locations thereon.

6. Apparatus as in claim 1 wherein the tool is pneumatically operable.

7. Apparatus as in claim 6 further comprising radio control means for generating signals and pneumatic control means for operating the tools in response to signals generated by the radio control means.

8. Apparatus for accessing hazardous materials stored in a container, said apparatus comprising: a base; adjustable mounting means mounted to the base for securely but releasably mounting the base to the container; a frame mounted to the base, the frame comprising at least one column extending from the base and upper and lower gantries movably mounted along the column, said upper gantry being lockably engageable with the column an upper tool mounted to the upper gantry and operative to move the lower gantry selectively toward and away from the container and a lower tool mounted to the lower gantry and operative to perform a selected work operation on the container; and, control means for operating the tool from a location remote from the container, whereby the base and the mounting means enables secure mounting of the apparatus to the container and whereby the control means enables the hazardous materials in the container to be safety accessed from a remote location.

9. Apparatus for accessing hazardous materials stored in a container, said container having a generally cylindrical side wall and opposed substantially circular generally planar top and bottom walls, a rim defined substantially intermediate the top wall and the cylindrical side wall, said apparatus comprising:
   a rigid generally Y-shaped base having a lower surface for mounting adjacent the rim of the container and an opposed upper surface, said Y-shaped base defining a pair of diverging arms and a leg extending from a central portion;
   a rim clamp mounted to each of said arms and extending from the lower side of the base for pivotal movement about an axis extending substantially orthogonal to the plane of the base, each said rim clamp including a plurality of clamping faces for selective engagement with the rim of the container;
   a leg mounted rim clamp adjustably mounted to the leg of the base for movement longitudinally therealong, the leg mounted rim clamp having a plurality of clamping faces and being mounted to the leg for pivotable movement about an axis extending substantially orthogonal to the plane of the base;
   a support platform adjustably mounted to the upper surface of the base for adjustable movement intermediate the rim clamps;
   means for securely positioning the support platform at a selected location on the base;
   at least one support column extending from the support platform and substantially orthogonal to the base;
   an upper gantry slidably movable along the support column toward and away from the base and being lockable in a selected position along the support column;
   a lower gantry slidably movable along the support column intermediate the upper gantry and the support platform;
   an upper tool mounted to the upper gantry and being operatively connected to the lower gantry for selectively moving the lower gantry toward and away from the support platform;
   a lower tool mounted to the lower gantry and comprising a working head for performing a selected accessing operation on the top wall of the container; and,
   pneumatic control means for operating the upper and lower tools, whereby the base is securely mountable to the rim of the container, and whereby the upper and lower tools are operative to move the working head of the lower tool toward and away from the container for performing a selected work operation on the top wall of the container.

10. Apparatus as in claim 9 wherein each rim clamp includes at least a first clamping face for engaging a rim of substantially rectangular cross-sectional configuration and at least a second clamping face for engaging a rim of non-rectangular cross-sectional configuration.

11. A system of apparatus for accessing containers of hazardous waster, said system comprising:
   a first base having means for clamping a generally cylindrical drum;

a second base having suction cup means for secure mounting to a generally curved surface of a container;

a first first frame selectively mounted to either the first or second base and having pneumatic means thereon for selectively removing a plug;

a second frame selectively mounted to either the first or second base and having a pneumatically powered cutting tool thereon and a second pneumatic tool for selectively moving the cutting tool relative to the frame and toward or away from a surface to be cut; and pneumatic control means for selectively operating the tools of either said first or second frames.

* * * * *